March 3, 1931.  J. GERHARDT  1,794,891
HEATER ATTACHMENT
Filed Nov. 25, 1929   2 Sheets-Sheet 1
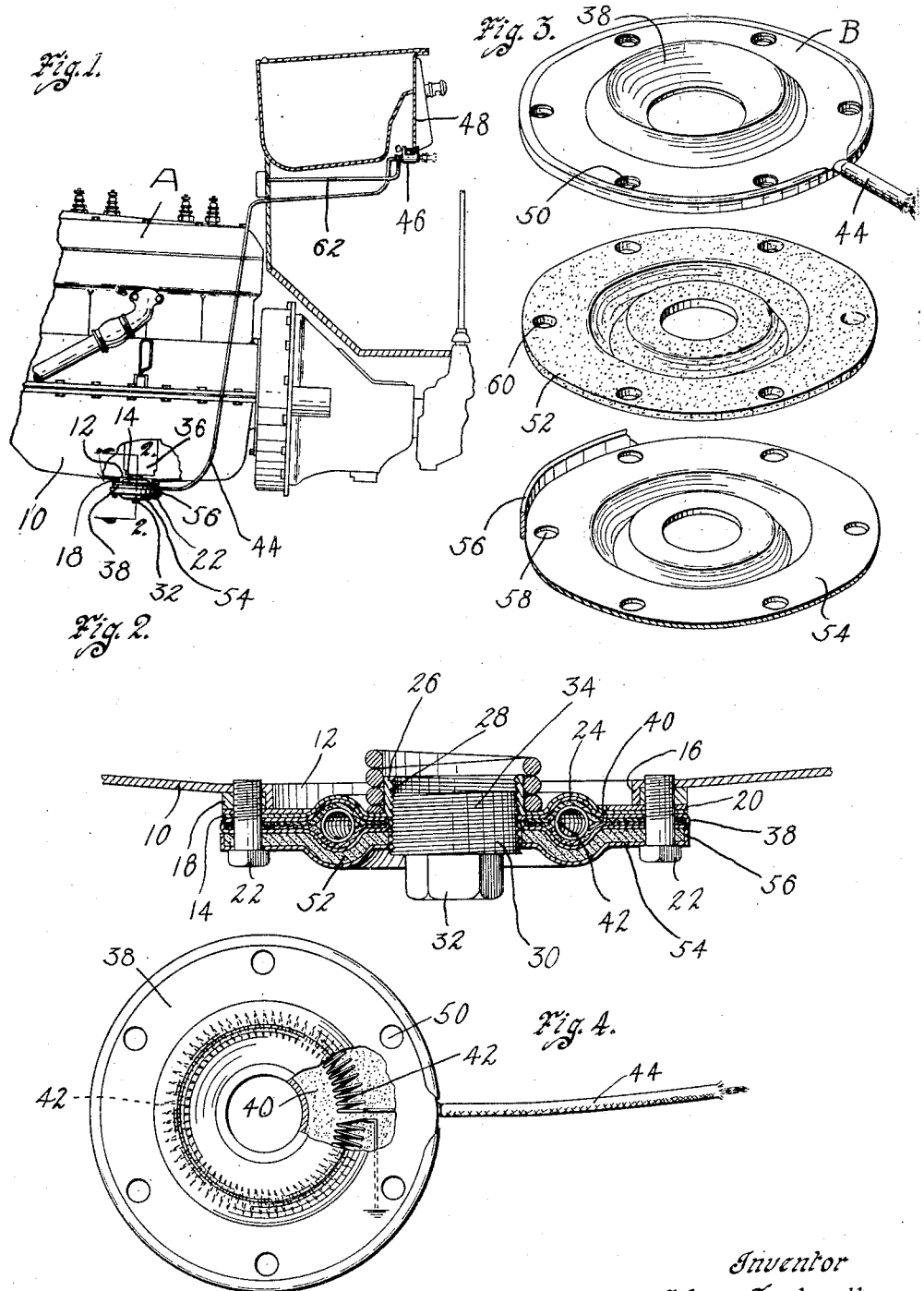

March 3, 1931.  J. GERHARDT  1,794,891
HEATER ATTACHMENT
Filed Nov. 25, 1929  2 Sheets-Sheet 2
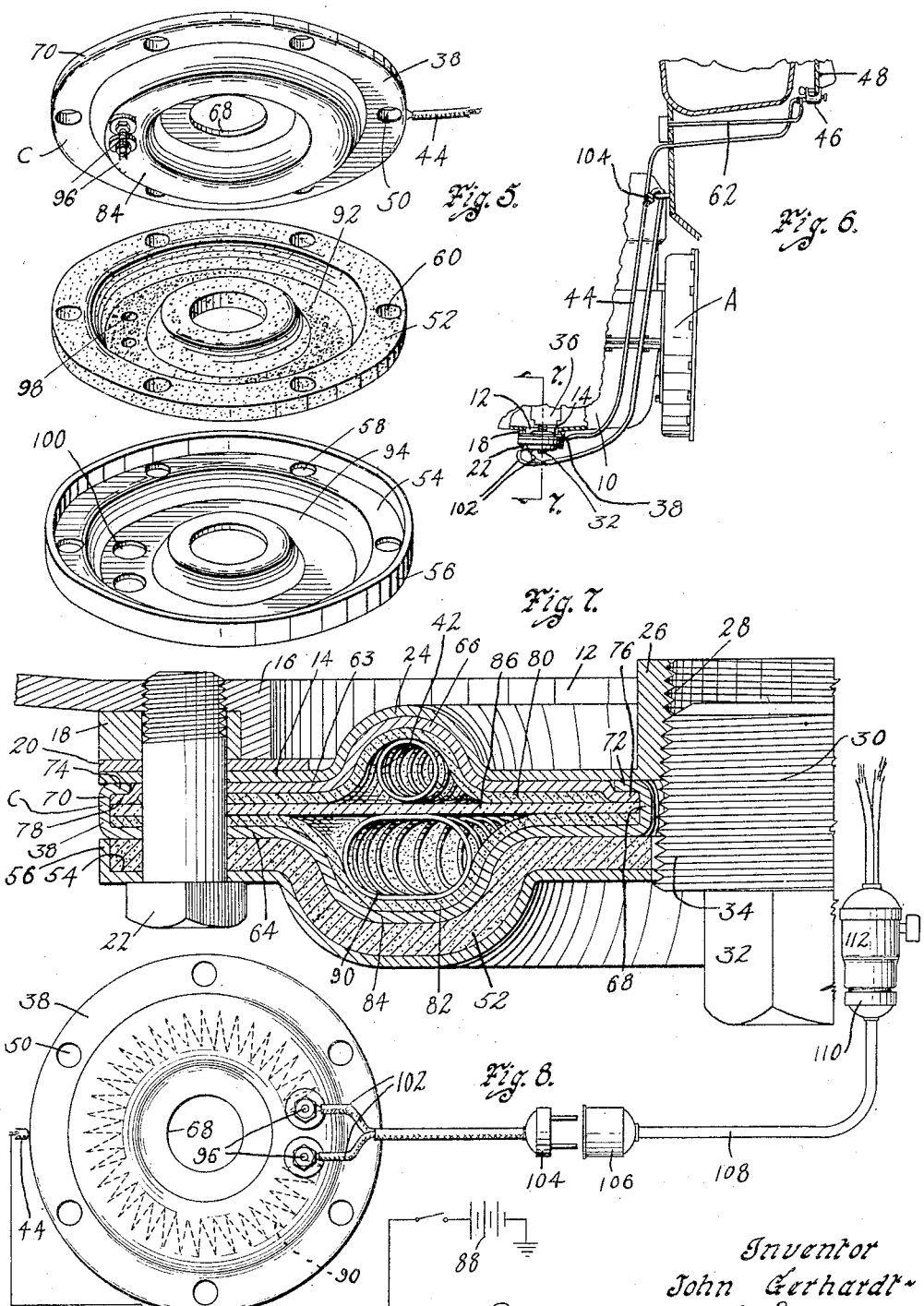

Patented Mar. 3, 1931

1,794,891

UNITED STATES PATENT OFFICE

JOHN GERHARDT, OF ST. PAUL, MINNESOTA, ASSIGNOR TO RITE-HETE MANUFACTURING CORPORATION, OF MINNEAPOLIS, MINNESOTA, A CORPORATION OF MINNESOTA

HEATER ATTACHMENT

Application filed November 25, 1929. Serial No. 409,555.

The object of my invention is to provide a heater attachment for use in connection with an oil pan of an automobile so arranged that the parts may be quickly and easily installed upon an automobile oil pan left thereon and controlled as desired, the parts being simple, durable and comparatively inexpensive to manufacture.

Still a further object is to provide a heater adapted to rest against the underside of a cover plate forming a part of the oil pan of an automobile, the attachment being electrically heated for transmitting heat therefrom through the cover plate and to the oil resting thereabove within the oil pan.

Still another object is to so locate the heater attachment relative to the oil pumping mechanism of an automobile engine as to enable a small amount of heat from the heater attachment to be transmitted to the pumping mechanism for insuring operation thereof during cold weather.

It is well known that in cold climates oil in oil pumps of automobiles, becomes frozen or so stiff that the pumps will not readily function and it is my object to so arrange a heater attachment in close proximity to the oil pump proper that the oil about the oil pump may be kept at a temperature higher than atmospheric temperature during cold weather.

Still a further object is to provide a simple device that may be anchored to the oil pan by means of bolts or the like which serve the common purpose of retaining the present commercial cover plate on the opening in the oil pan and at the same time hold the heater attachment thereagainst.

Still a further object is to provide a heater attachment of substantially the same outline as the cover plate over the opening in the drain pan and having one side of the attachment conforming to the contour of the plate against which it rests and at the same time provide a central opening within the heater attachment whereby free access may be had by an operator for removing the drain plug from the plate in which it is mounted.

Still a further object is to design the heater with two heating elements, one which may be connected with the battery of the automobile and other one with a house lighting circuit.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side plan view of a portion of an automobile engine with my improved heater attachment mounted thereon, parts being broken away to better illustrate the construction.

Figure 2 is a central vertical sectional view taken on the line 2—2 of Figure 1, showing the heater attachment in section and the plate to which it is attached.

Figure 3 is a perspective view of various parts of my heater attachment containing one heating element, said parts being spaced apart for showing their relative positions.

Figure 4 is a top plan view of the heater disc, parts being broken away to illustrate a heating element mounted therein.

Figure 5 is a perspective view similar to Figure 3 showing the parts of a modified form of heating attachment containing two heating elements.

Figure 6 is a side elevation of a portion of an automobile illustrating the heater disclosed in Figure 5 attached thereto.

Figure 7 is an enlarged sectional view on the line 7—7 of Figure 6 showing the modified form of attachment; and Figure 8 is a bottom plan view of the modified form of attachment, the figure including a circuit diagram.

The oil pan 10 has a downturned flange 16 and a ring or the like 18 secured thereagainst on the outside. A gasket 20 is interposed between the cover plate 14 and the oil pan 10. The cover plate is provided with a plurality of openings for receiving bolts or the like 22. The bolts 22 project into the ring 18 and into the oil pan 10 whereby the plate 14 is held in position.

The gasket 20 serves to prevent leakage between the drain pan and the cover plate. The cover plate is provided with an upwardly directed annular groove 24 which is intended to reinforce the strength of the cover plate proper. Within the center of the cover plate 14 is formed an upwardly directed hub 26 having screw threads 28 therein.

A drain plug 30 having a nut head 32 and screw threads 34, extends into the screw threaded hub 26 for sealing the opening formed by the screw threaded hub 26. Removal of the plug 30 allows draining of the oil within the oil pan 10. The plug 30 may be referred to as a drain plug.

Within the drain pan 10 and above the plate 14 is the ordinary oil pump mechanism 36. The oil pump mechanism is inserted within the oil pan 10 through the opening 12 hence the enlarged opening 12 and the cover plate 14 therefor.

In case it is desired to remove the oil pump 36 for any reason, it is necessary to remove the plate 14. My heater attachment is designed to cooperate with the already standard equipment upon the automobile oil pan and includes a heater disc casing B. The casing B is substantially flat or disc like and has upon its upper and lower surfaces an outturned annular rib 38 which is semi-cylindrical in cross section.

The outturned ribs 38 are oppositely spaced so as to provide a receiving pocket within the casing proper. Within the casing of the heater attachment I place insulating material 40 and between the insulating material 40 is a heating coil 42. The heating coil 42 within the heater attachment B or the casing portion thereof, is received within the pocket formed by the ribs 38.

The heating coil 42 is electrically operated and one end of the coil is grounded to the casing of the heater attachment while the other end has a lead wire 44 thereon which lead wire is connected to a control switch 46 mounted in the driver's compartment 48 of the automobile proper.

The switch 46 provides a remote control for the heater attachment as will be hereinafter more fully set forth. The heater attachment B is provided with a plurality of circumferentially spaced openings 50 adapted to have the bolts 22 project therethrough. The bolts 22 project through the openings 58 in the casing plate 54 and through the openings 60 in the insulating disc 52 whereby the bolts 22 serve to retain the three members shown in Figure 3, in assembled position relative to each other and in position where the heater attachment B rests against the underside of the plate 14.

In Figures 5 to 8 on the drawing I have illustrated a modified form of construction in which two heating elements are contained within the casing C similar to the casing B. Referring specifically to Figure 7 of the drawings, it will be noted that the cover plate 14 remains in position as referred to in connection with the form of device illustrated in Figures 1 to 4.

The casing C consists of a top plate 62 and a bottom plate 64. The top plate 62 is provided with an upwardly extending rib 66 adapted to fit in the rib 24 of the cover plate 14. The bottom plate 64 has upwardly extending rims 68 and 70 terminating in flanges 72 and 74 pointing toward each other.

The flanges 72 and 74 extend over depressed peripheries 76 and 78 of the upper plate 62. Thus a closed casing is formed and the joints between them may be soldered or brazed if desired.

Within the casing C is a disc of insulation 80 fitting against the upper plate 62 and a second disc of insulation 82 fitting against the lower disc 64. It may here be mentioned that the lower disc 64 is provided with a depressed rib 84 similar to the rib 66 of the plate 62 with the exception that it has greater width.

Between the insulating discs 80 and 82, I position a disc 86 of insulation, preferably mica. The heating coil 42 operated by the battery 88 of the automobile is positioned within the rib 66 of the upper plate 62 and a second coil 90 is positioned within the depressed rib 84 of the plate 64. The heating element 90 is designed for current of a higher voltage than the storage batery of an automobile such as 110 volt house lighting current.

Below the lower plate 64 the disc 52 of insulation is positioned for preventing the conduction of heat from the casing C to the atmosphere. The insulated plate 52 in the top of the device shown in Figure 5 of course, would have a depressed rib 92 wider than that shown in the plate used in connection with Figure 3.

The bottom cover plate 54 is provided with a widened rib 94 to fit over the rib 92 of the insulating disc 52. The ends of the heating element 90 are connected with binding posts 96 which extend downwardly from the casing C as clearly shown in Figure 5. The posts 96 are well insulated from the casing C and the insulating plate 52 and cover plate 54 are provided with openings 98 and 100 respectively for the binding post 96 to extend through.

The openings 100 are sufficiently large to insure against metal parts of the binding post 96 contacting with the cover plate 54. Lead wires 102 are connected with the binding post 96 and extend upwardly to a connecting device 104 having prongs thereon.

When the automobile is driven into a garage or the like, the heating element 90 may be operated by connecting the member 104 with a socket 106. The socket 106 is electrically connected by a cable 108 to a plug 110 adapted to be screwed into an ordinary lighting socket 112. Thus my heating device may be utilized in connection with either the house lighting current or the battery current of the automobile.

The element 90 is especially desirable on cold mornings when it is necessary to warm up the oil in the automobile before the oil circulating system will function properly and so the engine can be cranked easily by the starter of the automobile.

It may conveniently be hooked up to the house lighting circuit by means of the extension cord 108 after the hood of the automobile has been raised. If found desirable the connector device 104 may be situated on some other part of the automobile so that it may not be necessary to raise the hood before connecting it in the electric circuit.

*Practical operation and installation*

When it is desired to install my heater attachment upon the oil pan if an automobile, it is only necessary to remove the bolts 22 which are standard equipment upon the automobile and to place the heater attachment, the insulating disc and the casing all shown in Figure 3 or Figure 5 depending on which type of heater is being installed, in position against the underside of the plate 14.

The bolts 22 are then reinserted through the openings provided for receiving them and all of the parts are mounted on the underside of the oil pan. In the event the bolts 22 which are equipment upon the automobile, are not of sufficient length, then bolts slightly longer may be used.

A switch or control 46 is mounted in a suitable position in the driver's compartment of the automobile such as on the dash or on the steering post and one end of the lead wire 44 is connected thereto and another wire 62 connects the switch to the electrical energy or source of electrical supply of the automobile proper such as the battery 62.

The openings 50 in the heater attachment B are made to correspond with the openings in the cover plate 14 so that the same bolts 22 may be used for projecting through the openings 50 and for retaining the heater attachment against the underside of the plate 14.

The reinforcing rib or groove 24 upon the plate 14 receives the upper rib 38 of the heater attachment B. It will be noted that the heater attachment B is made of such outline and shape so as to conform to the contour or cross section of the plate 14 against which it rests.

It is desirable to insulate the heater attachment from outside atmosphere and for that purpose I provide an insulating disc 52 such as asbestos packing adapted to rest against the underside of the heater attachment B. A casing plate 54 rests against the insulating disc 52 and is of substantially the same size and shape as the plate 14 except however, the casing plate 54 has an upstanding flange 56 which serves to retain the peripheral edge of the insulating disc or material 52. The insulating disc 52 and the casing plate 54 may be dispensed with if found desirable.

The casing plate 54 as well as the insulating material or disc 52 are formed with a plurality of circumferentially spaced openings 58 and 60 respectively which openings are designed to register with the openings 50 formed in the heater attachment B.

When it is desired to have the heating coil 42 function, it is only necessary to close the control switch 40 as shown in dotted lines in Figure 1, at which time the electric current is "on."

The heater attachment B or C as the case may be, will transmit heat to the plate 14 and to the pump mechanism 30 as well as the oil therearound. My heater attachment will function properly when either of the heating elements 42 or 90 are in operation, the element 90 being more economical in use than the element 42. However it is sometimes impossible to have the proper current to the heating element 90 whereupon the battery element 42 may be operated.

The parts of my attachment may be easily and quickly installed and when once in place, need not be removed because when inoperative they do not interfere in any way with the removal of the drain plug or for gaining access to the oil pump mechanism.

The heater attachment and plate may all be removed at the same time in case access is desired into the interior of the oil pan and to the pump mechanism mounted therein.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. The combination with an automobile engine having an oil pan provided with an enlarged opening therein and a cover plate for said opening, of a heater attachment including a disc like element adapted to fit against the underside of the cover plate, common means for retaining the cover plate and heater attachment against each other and in position on the oil pan and heating means embedded in said element and located outside of said oil pan and said cover plate.

2. The combination with an automobile engine having an oil pan provided with an enlarged opening therein and a cover plate for said opening having a drain opening therein and a drain plug for the drain opening, of a heater attachment including a disc like element having a central opening therein adapted to fit against the underside of the cover plate and to extend around the drain plug, common means for retaining the cover plate and heater attachment against each other and in position on the oil pan and heating means embedded in said element, said attachment permitting free access to the drain plug as and for the purposes stated.

3. In combination with an automobile engine having an oil pan provided with an enlarged opening therein and a cover plate for said opening, a heater attachment including a disc like element adapted to fit snugly against the underside of the cover plate and having its upper surface conforming to the contour of said cover plate, a heat insulating disc mounted on the underside of said disc like element and conforming to the contour thereof, common means extending through said heat insulating disc, said disc like element and said cover plate for retaining them in assembled position on the oil pan and heating means carried within said disc like element.

4. A heater attachment adapted for use in connection with an oil pan of an automobile having an enlarged opening therein and a cover plate therefor, comprising a heater disc having heating means therein adapted to rest against the underside of said cover plate and means for insulating the underside of said heater disc from atmosphere and common means extending through said insulating means, said heater disc and said cover plate for supporting them in assembled relationship and for retaining them in operative position.

5. A heater attachment adapted for use in connection with an oil pan of an automobile having an enlarged opening therein and a cover plate therefor, comprising a heater disc having heating means therein adapted to rest against the underside of said cover plate and means for insulating the underside of said heater disc from atmosphere and common means extending through said insulating means, said heater disc and said cover plate for supporting them in assembled relationship and for retaining them in operative position and a remote control for rendering said heating means operative or inoperative.

6. In combination with an automobile engine having an oil pan provided with an enlarged opening therein and a cover plate for said opening, of a heater attachment including a disc like element adapted to fit against the underside of the cover plate, common means for retaining the cover plate and heater attachment against each other and in position on the oil pan, heating means embedded in said element and operatively connected to a source of electrical energy and control means for supplying electrical energy to said heating means.

7. An attachment of the class described comprising a heater disc casing, insulating material therein, a heating coil within said casing and insulated therefrom by said insulating material, said casing having an annular rib formed on each side thereof for providing a receiving pocket within said casing for said heating coil and openings formed in said casing for permitting anchoring bolts to extend therethrough.

8. An attachment of the class described comprising a heater disc casing, insulating material therein, heating coils within said casing and insulated therefrom by said insulating material, said casing having an annular rib formed on each side thereof for providing a receiving pocket within said casing for each of said heating coils and openings formed in said casing for permitting anchoring bolts to extend therethrough.

Des Moines, Iowa, September 27, 1928.
JOHN GERHARDT.